United States Patent [19]

Foster et al.

[11] 4,271,228

[45] Jun. 2, 1981

[54] SHEET MATERIAL CONTAINING EXFOLIATED VERMICULITE

[75] Inventors: Richard P. Foster, Norwood; Gregory C. Brodin, Foxboro, both of Mass.

[73] Assignee: Hollingsworth & Vose Company, East Walpole, Mass.

[21] Appl. No.: 117,986

[22] Filed: Feb. 4, 1980

[51] Int. Cl.³ .......................... D04D 1/08; B32B 5/02
[52] U.S. Cl. ................................... 428/281; 428/237; 428/241; 428/288; 428/323; 428/324; 428/325; 428/328; 428/920; 277/22; 277/166; 277/235 B
[58] Field of Search ............... 428/288, 323, 324, 328, 428/325, 404, 258, 241, 920; 162/181 C; 277/235 B, 22, 166

[56] References Cited

U.S. PATENT DOCUMENTS

| 2,175,175 | 10/1969 | Denning | 162/181 C |
|---|---|---|---|
| 2,300,137 | 10/1942 | Salisbury | 162/181 C |
| 2,538,326 | 1/1951 | Denning | 162/181 C |
| 3,074,834 | 1/1963 | Matlin | 428/288 |
| 3,434,917 | 3/1969 | Kraus | 162/145 |
| 3,533,907 | 10/1970 | Kawam | 162/145 |
| 4,035,215 | 7/1977 | Goldstone | 428/288 |
| 4,043,862 | 8/1977 | Roberts | 162/181 C |

*Primary Examiner*—Ellis P. Robinson

[57] ABSTRACT

Flexible sheet material adapted for use as heat resistant gaskets, heat insulation, electrical insulation and support media in the form of a bonded fibrous web containing vermiculite, organic fibers and binder material.

5 Claims, No Drawings

SHEET MATERIAL CONTAINING EXFOLIATED VERMICULITE

This application is a continuation-in-part of copending application Ser. No. 9,535 filed Feb. 5, 1979 now abandoned.

This invention relates to flexible sheet material in the form of a bonded fibrous web containing in combination a blend of exfoliated finely divided vermiculite with other asbestos-free finely divided inorganic fillers, organic fibers, and an organic binder, which sheet is useful as a heat resistant gasket having a unique combination of properties and which also can be used as heat insulation, as electrical insulation, and as a supporting medium for dehumidifiers and heat exchangers. The sheet is preferably a water-laid sheet and preferably contains fibrillatable organic fibers. The sheet material can also optionally contain synthetic inorganic fibers such as quartz, ceramic, glass or the like in addition to the organic fibers.

It has previously been proposed to provide a water-laid sheet of chemically exfoliated vermiculite and cellulose or polymeric or asbestos fibers, or montmorillonite clays, without any binder, as described in Kraus et al., U.S. Pat. No. 3,434,917, issued Mar. 25, 1969; such sheet material is said to have utility as high temperature insulation and electrical insulation, but it is deficient in wet crush strength, toughness, compressibility, and in other important properties, and is also difficult to manufacture. It has also been proposed in Kawam et al., U.S. Pat. No. 3,533,907, granted Oct. 13, 1970 to make a thermal water-repellant insulation board as a water-laid sheet containing water-repellant asphalt coated heat-exfoliated vermiculite and cellulose or asbestos fibers along with a binding agent. The product has very low density and high compressibility, so that it is completely unsuited for use as a gasket with respect to the sealing of fluids.

It has now been found that flexible sheet material in the form of a bonded fibrous web containing organic fiber, organic binder, and a blend of finely-divided exfoliated vermiculite with another asbestos-free inorganic finely divided particulate filler possesses a uniquely advantageous combination of properties rendering it particularly suitable as gasket material, for example, as gaskets in internal combustion engines and exhaust systems. The sheet material also is useful as heat insulation as, for example, for insulating mufflers and exhaust system components of internal combustion engines, as electrical insulation, and as support media for heat exchangers and dehumidifiers.

The vermiculite present in the sheet must be sufficiently small in particle size to pass a No. 80 screen, U.S. Standard (180 micrometers in diameter); preferably at least 90% by weight passes a No. 100 screen (150 micrometers in diameter) and up to 50% passes a No. 325 screen (45 micrometers in diameter). Particle size within the lower end of the range appears to help drying, which may be due to the reduction of interstitial pockets in the exfoliated particle of vermiculite, and also provides improved tensile strength and decreased water absorption of the sheet. Particles larger than those passing a No. 80 screen are unsatisfactory in that the finished sheet displays inferior crush resistance and water absorption characteristics. Vermiculite from any source may be used, although the best results have been obtained with vermiculite obtained from Enoree, South Carolina and from Libby, Montana. It must be exfoliated, preferably by heating to 1200° F. or more to remove irreversibly the bonded water between the platelets. The particle size can be reduced to within the desired range by shearing, either wet or dry, e.g., by conventional papermaking techniques as, for example, by passing an aqueous dispersion of the vermiculite through a beater, pulper, or refiner. The vermiculite is preferably free from any waterproofing agent such as asphalt before being added to the beater, pulper, or refiner.

The inorganic particulate asbestos-free filler blended with the vermiculite can be any of the many such fillers available, subject to the same restrictions on particle size as the vermiculite. Preferred filler particles include minerals such as mica, particularly sericite, limestone (calcium carbonate), and brucite (magnesium hydroxide). Other inorganic filler particles which can be used include, for example, barytes, pumice or volcanic ash, feldspar, various clays such as attapulgite, bentonite and kaolin as well as quaternized clays such as quaternized bentonite, glass microspheres, graphite, glass fiber particles, and other inorganic or mineral filler particles commonly used in the paper, rubber, and plastics industries. While talc and similar slippery or unctuous particulate fillers can be used in the blend with vermiculite, they are not preferred because they have an excessively deleterious effect upon the crush resistance of the finished sheet.

The amount of vermiculite present in the blend with other particulate filters can range from 25 to 70% by weight of the total blend, preferably from 25 to 35%.

No asbestos fibers are necessary or desirable in the sheet material of the present invention both because of the carcinogenic properties of asbestos and because sheet materials made with asbestos display properties inferior to those of the sheet material of the present invention with respect to many of the important characteristics of gaskets as well as heat insulation and support media.

The larger the proportion of vermiculite in the blend with the inorganic particulate asbestos-free filler the higher the tensile strength and sealability characteristics of the finished sheet; in addition, in the case of a water-laid sheet, the less is the cling of the sheet to the wire on which it is formed and the less fill-in or blinding of the wire occurs. The lower the proportion of vermiculite in the blend, the better is the crush resistance and the lower are the water or antifreeze absorption and swelling characteristics of the finished sheet; in addition, in the case of a water-laid sheet, the higher is the production rate on the papermaking machine.

In the absence of vermiculite, the inorganic filler is incapable of producing the desired sealability and tensile strength unless the proportion of organic binder in the sheet is substantially increased; but this increase leads to an objectionable decrease in crush resistance and in torque retention (i.e., increased stress relaxation).

The sheet material of the present invention retains its shape and effectiveness as a gasket and as heat insulation at very high temperatures even though most of the organic fibers and organic binder are destroyed at such temperatures. As electrical insulation, it displays good dielectric resistance and other electrical properties. It requires a low pressure for densification during manufacture, an important attribute in view of the necessity for the sheet material to have a density of at least 0.64 g per cubic centimeter in order to function satisfactorily as a gasket. The densified finished product exhibits superior sealing properties (ASTM F-37-68), torque loss or stress relaxation (ASTM F-38, Method B), and creep resistance properties (ASTM F-37-62 T) at elevated temperature, and tensile strength, as well as displaying superior self-release characteristics. In general, flexible sheet material in order to be useful as heat resistant gaskets must have a density of 0.64 to 1.92 g per cc, a tensile strength of at least 500 psi (independent of machine direction), a compression of 7 to 50% and a recovery of 20 to 70% at 1,000 psi, a sealability of 30 cc/hr maximum at 500 psi, and a torque loss or stress relaxation of 50% maximum at 212° F., preferably from 5 to 40%. The flexible sheet material of the present invention displays all of the foregoing characteristics as well as desirable absorption and swelling characteristics. It is also desirable for many uses that it have a crush resistance from 5 to 70%.

The fibers employed in the sheet material of the present invention can be any of the organic fibers commonly employed in making water-laid fibrous webs or sheets such as cellulosic fibers including wood pulp, and a variety of synthetic organic fibers such as regenerated cellulose, acetate rayon, superpolyamide or nylon, polyester, acrylics, phenolics, and aramides such as that sold under the trademark Kevlar. Particularly preferred are phenol-formaldehyde resin fibers such as those sold under the trade name "Novaloid" and fibrillatable organic fibers including the cellulosic fibers, the acrylic fibers and the aramides such as those sold under the trade name "Kevlar". The amount of fiber in the sheet may vary from 1 to 30% by weight of the total sheet except for binder, preferably from 5 to 20% by weight of the total sheet. The fiber length is not critical, but is preferably less than ¼ inch, any papermaking or web-forming fiber being satisfactory. It is also possible to include in the sheet as an optional material a small proportion, up to 25% by weight of the total sheet except for binder, of synthetic inorganic fibers which are relatively long, of the order of ⅛ to ½ inch in length, which provide reinforcement at very high temperatures, particularly in the case of sheet material to be used as heat insulation; however the presence of glass fibers has a deleterious effect on the sealing capability of the sheet as well as its liquid absorption properties and ease of densification, making it undesirable in sheet material to be used as a heat resistant gasket.

The binder used can be any of the usual organic binders employed in fibrous sheets or webs. A variety of such binders are in common use including such organic polymeric materials as styrene-butadiene rubber, acrylonitrile-butadiene rubber, acrylonitrile-butadiene-styrene copolymers, natural rubber, neoprene, polyacrylates, polyvinylchloride and plasticized polyvinylchloride, polyvinylidene chloride, polyvinylacetate, ethylene vinylacetate copolymers, phenolic resins, melamine formaldehyde resins, epoxy resins, polyurethanes, and the like. Most of such binders are film-forming materials. Blends of two or more binders can be used, and the usual additives or compounding agents may be employed along with the binder or as a part of it, such as vulcanizing agents, accelerators, catalysts, antioxidants, deposition aids, waterproofing aids, oleophobic materials, plasticizers and extenders, and the like. The amount of binder is not critical and may vary from 3 to 30% by weight, preferably 5 to 20%, of the total weight of the remainder of the sheet, i.e., of the organic fibers and the blend of vermiculite and inorganic particulate asbestos-free filler.

When the sheet material is wet-laid, which is preferred, the furnish can be supplied to the pulper and/or refiner and deposition chest at high consistency, of the order of 4 to 10%, and water removal at the wire and the wet presses is satisfactory, of the order of 40% to 50%. Subjecting the furnish including fibrillatable fibers such as wood pulp to beating for a long time, tends to increase the density, strength, and flexibility of the finished sheet as well as improving its sealing capability and its fluid absorption characteristics. The binder is preferably introduced in the form of an aqueous dispersion or latex at any desired stage following the pulper, beater or refiner. Following web or sheet formation on the wire or on a cylinder, the sheet is dried, for example, on cans, and calendered to increase its density to at least 0.64 g per cc.

The following specific examples are intended to illustrate more fully the nature of the present invention without acting as a limitation upon its scope.

EXAMPLES

Twenty-one different furnishes having the composition set forth in the following table were prepared by mixing the ingredients in the specified proportions by weight for ¼ to ½ hr. in a pulper, then forming a water-laid sheet on a Fourdrinier wire, can drying, and calendering to compress the sheet to the specified density. In each case, the binder including the various additives was introduced as a latex or aqueous dispersion in the usual manner, and the furnish was supplied to the head box at a consistency of 4%. In each case there was used a blend of vermiculite with one or more of calcium carbonate, sericite, magnesium hydroxide, clay, barytes, or mica. The amount of vermiculite in each case was 1/6, ⅓, ½, or ⅔ of the total blend, the remainder consisting of one or more of the foregoing fillers. There was also included in each case a blend containing 1/6 vermiculite for purpose of contrast. The vermiculite in every case was heat-exfoliated, its particle size varying somewhat with the length of time of beating or refining, but all of it passing 80-mesh screen (U.S. Standard). The particle size of the other filler in every case was small enough to pass 80 mesh screen, and more than 90% passed a 100 mesh screen.

|  | Parts by Weight |
|---|---|
| Kraft cellulose fibers (350 CSF) | 5.2 |
| Non-fusible synthetic organic fibers | 5.2 |
| Binder |  |
| Phenolic resin | 1.5 |
| Acrylonitrile-butadiene copolymer, curing agents and antioxidant | 12.1 |
| Blend of vermiculite with six different inorganic asbestos-free fillers in varying proportions | 76 |

The significant physical properties of each sheet, after drying and densifying, were measured. The results are summarized in the following table in which there are listed the average values for all sheets classified according to the relative proportion of vermiculite in the blend. There are also included for comparative purposes the average values for controls containing only vermiculite and those containing only other fillers and no vermiculite. Similar results can be obtained using blends of vermiculite with other asbestos-free inorganic fillers.

| Proportion of Vermiculite in Blend | Tensile Strength psi | Crush Resistance at 50,000 psi 300° F. anti-freeze/water % Extrusion | Sealability 500 psi cc/hr leakage | Water Absorption 22 hr at RT % by weight | Torque Loss % | Water Content on Fourdrinier wire % by weight |
|---|---|---|---|---|---|---|
| 1/6 | 1213 | 22.2 | 192 | 21.2 | 35.4 | 45.6 |
| ⅓ | 1482 | 25.5 | 25.5 | 24.6 | 29.6 | 51.4 |
| ½ | 1429 | 60.2 | 22.6 | 24.8 | 35.0 | 55.5 |
| ⅔ | 1879 | 49.9 | 14.0 | 33.6 | 34.6 | 60.2 |
| Controls | | | | | | |
| All Vermiculite | 2334 | 105.6 | 13.1 | 37.6 | 35.6 | 63.6 |
| No Vermiculite | 1040 | 12.0 | 345 | 13.5 | 31.4 | 37.7 |

All of the products of the foregoing Examples were particularly useful as heat resistant gaskets and all were useful also for heat insulation, for heat resistant electrical insulation, and for a supporting medium for dehumidifiers and heat exchangers.

What is claimed is:

1. A sheet material adapted for use as heat resistant gaskets, heat insulation, electrical insulation, and supporting media for dehumidifiers and heat exchangers, said material being in the form of a fibrous web comprising organic fiber, organic binder, and a blend of completely exfoliated vermiculite free from asphalt with another inorganic asbestos-free particulate filler, said blend having a particle size to pass a No. 80 screen, the amount of said fiber being from 1 to 30% by weight and the amount of said blend being from 70 to 99% by weight, the amount of binder being from 3 to 30% by weight, all based on the total weight of fiber and blend, and the amount of vermiculite being from 25 to 70% by weight of said blend, said sheet material having a density of 0.64 to 1.92 g per cc, a tensile strength of at least 500 psi, a compression of 7 to 50% and a recovery of 20 to 70% at 1000 psi, a sealability of 30 cc/hr maximum at 500 psi, and a stress relaxation of 50% maximum at 212° F.

2. A sheet material as claimed in claim 1 in which the amount of vermiculite is from 25 to 35% by weight of said blend.

3. A sheet material as claimed in claims 1 or 2 in which the amount of said organic fiber is from 5 to 20% by weight and the amount of said binder is from 5 to 20% by weight.

4. A sheet material as claimed in claim 2 in which the amount of said organic fiber is from 5 to 20% by weight and the amount of said binder is from 5 to 20% by weight, said sheet material having a sealability from 5 cc/hr to 30 cc/hr at 500 psi, and a stress relaxation from 5 to 40%, suitable for use as a heat resistant gasket.

5. A sheet material as claimed in claim 4 having a crush resistance from 5 to 70%.

* * * * *